(12) United States Patent
Shih et al.

(10) Patent No.: US 9,280,211 B2
(45) Date of Patent: Mar. 8, 2016

(54) REMOTE CONTROLLER

(71) Applicant: Primax Electronics Ltd., Neihu, Taipei (TW)

(72) Inventors: Yu-Yen Shih, Taipei (TW); Yi-Guang Chen, Taipei (TW)

(73) Assignee: PRIMAX ELECTRONICS LTD., Taipei (TW)

( * ) Notice: Subject to any disclaimer, the term of this patent is extended or adjusted under 35 U.S.C. 154(b) by 414 days.

(21) Appl. No.: 13/846,652

(22) Filed: Mar. 18, 2013

(65) Prior Publication Data
US 2014/0218180 A1 Aug. 7, 2014

(30) Foreign Application Priority Data

Feb. 1, 2013 (TW) .............................. 102103950 A

(51) Int. Cl.
| | | |
|---|---|---|
| G05B 19/02 | (2006.01) | |
| H04L 17/02 | (2006.01) | |
| H04N 5/44 | (2011.01) | |
| G08C 19/16 | (2006.01) | |
| G06F 3/0346 | (2013.01) | |
| G06F 3/0338 | (2013.01) | |
| G08C 17/00 | (2006.01) | |

(52) U.S. Cl.
CPC ............ *G06F 3/0346* (2013.01); *G06F 3/0338* (2013.01); *G08C 17/00* (2013.01); *H04N 5/4403* (2013.01); *G08C 2201/12* (2013.01); *G08C 2201/32* (2013.01); *G09G 2330/021* (2013.01); *Y02B 60/50* (2013.01)

(58) Field of Classification Search
None
See application file for complete search history.

(56) References Cited

U.S. PATENT DOCUMENTS

| | | | |
|---|---|---|---|
| 8,432,305 B2 * | 4/2013 | Choi et al. ..................... | 341/176 |
| 2007/0195074 A1 * | 8/2007 | Gelissen ........................ | 345/204 |
| 2007/0259689 A1 * | 11/2007 | Kutaragi ..................... | 455/556.1 |
| 2009/0051481 A1 * | 2/2009 | Park et al. ...................... | 340/2.1 |
| 2011/0140867 A1 * | 6/2011 | Maier ......................... | 340/12.22 |
| 2011/0239026 A1 * | 9/2011 | Kulik ............................ | 713/324 |

\* cited by examiner

*Primary Examiner* — Mohamed Barakat
(74) *Attorney, Agent, or Firm* — Kirton McConkie; Evan R. Witt

(57) ABSTRACT

A remote controller is provided. The remote controller includes an input interface and an angle sensor. The input interface is used for receiving an input of a user. The angle sensor is used for detecting a rotation angle of the remote controller. In response to a first rotation angle of the remote controller, the input interface is enabled by the remote controller. Consequently, the input interface may be triggered by the user to generate an input signal. After the input interface is enabled, if the input interface has not been triggered for a predetermined time period, the remote controller is operated in a power-saving mode. In response to a second rotation angle of the remote controller, the remote controller is operated in the power-saving mode.

7 Claims, 5 Drawing Sheets

REMOTE CONTROLLER

FIELD OF THE INVENTION

The present invention relates to a remote controller, and more particularly to a remote controller with an angle sensor.

BACKGROUND OF THE INVENTION

For remotely controlling electronic devices such as audio devices, televisions or air conditioners, conventional remote controllers are used to issue wireless signals to the electronic devices. According to the wireless signals, the electronic devices execute corresponding functions. Generally, during the process of using the electronic device, it does not take much time to control the electronic device. In other words, the conventional remote controller is not frequently used.

Although the conventional remote controller is often idled, the conventional remote controller should be continuously in the working mode in order to maintain the maneuverability and meet the user's requirements. In other words, the power consumption of the conventional remote controller is high. Moreover, if the conventional remote controller is accidentally touched by the user or influenced by an external force, the conventional remote controller may be erroneously operated.

Recently, an intelligent TV is introduced into the market. Since the intelligent TV has the capability of connecting to the internet, the function of the television is not restricted to the playback of TV programs. Moreover, by connecting the intelligent TV to the internet, the user may play internet games, hire or purchase movies or join the networking community activities. For smoothly controlling plentiful functions of the intelligent TV, the remote controller of the intelligent TV should be equipped with more keys.

Due to limitations of the volume of the remote controller, plural keys may be disposed on a top surface and a bottom surface of the remote controller, respectively. In this situation, the remote controller is also referred as a double-sided remote controller. However, the double-sided remote controller still has some drawbacks. For example, when the double-sided remote controller is held by the user, the top surface and the bottom surface of the double-sided remote controller are simultaneously touched by the user's hand. Under this circumstance, the possibility of erroneously operating the double-sided remote controller is increased, and the use of the double-sided remote controller is inconvenient.

Therefore, there is a need of providing an improved remote controller in order to overcome the above drawbacks.

SUMMARY OF THE INVENTION

The present invention provides a remote controller for avoiding the problem of erroneously operating the remote controller.

In accordance with an aspect of the present invention, there is provided a remote controller. The remote controller includes a first input interface, an angle sensor, and a microprocessor. The first input interface is used for generating a first input signal. The angle sensor is used for detecting a rotation angle of the remote controller, and generating a first angle signal or a second angle signal according to a magnitude of the rotation angle. The microprocessor is electrically connected with the first input interface and the angle sensor. When the angle sensor generates the first angle signal, the first input interface is enabled by the microprocessor. If the first input interface has not been triggered for a predetermined time period after the first input interface is enabled, the microprocessor is operated in a power-saving mode. When the angle sensor generates the second angle signal, the microprocessor is operated in the power-saving mode.

The above objects and advantages of the present invention will become more readily apparent to those ordinarily skilled in the art after reviewing the following detailed description and accompanying drawings, in which:

DETAILED DESCRIPTION OF THE PREFERRED EMBODIMENT

Figure 1:
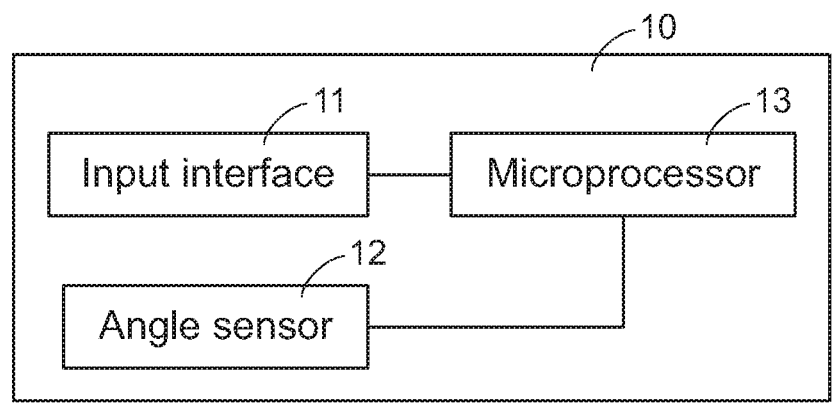
FIG. 1 is a schematic functional block diagram illustrating a remote controller according to a first embodiment of the present invention.
Figure 2:
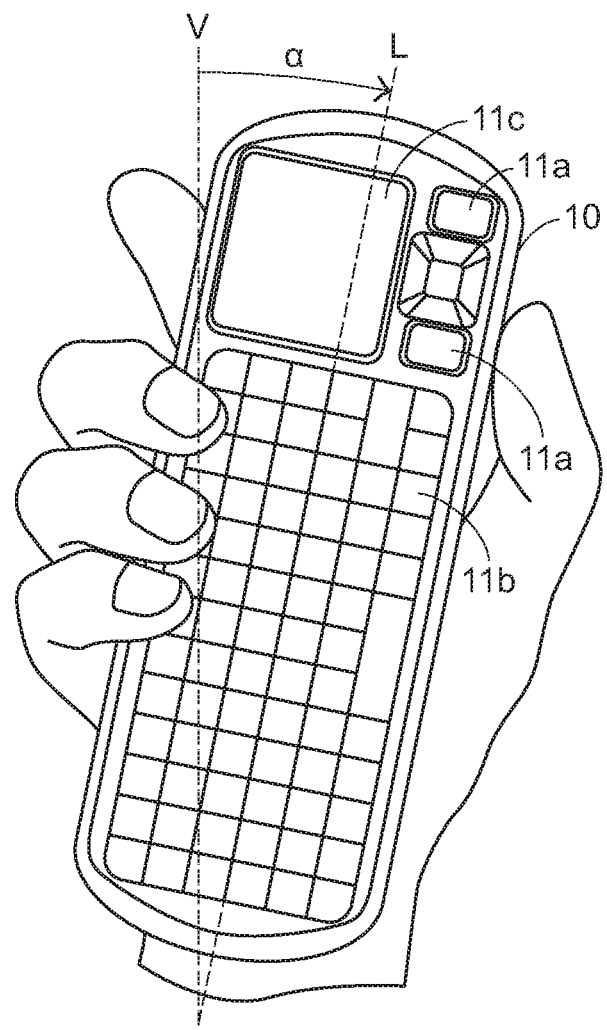
FIG. 2 schematically illustrates the outer appearance of the remote controller according to the first embodiment of the present invention.

Please refer to FIGS. 1 and 2. FIG. 1 is a schematic functional block diagram illustrating a remote controller according to a first embodiment of the present invention. FIG. 2 schematically illustrates the outer appearance of the remote controller according to the first embodiment of the present invention. As shown in FIGS. 1 and 2, the remote controller 10 comprises an input interface 11, an angle sensor 12, and a microprocessor 13. As shown in FIG. 1, the input interface 11 is electrically connected with the microprocessor 13 for generating an input signal, thereby controlling the operations of an electronic device. Hereinafter, the present invention will be illustrated by referring an intelligent TV as the electronic device. It is noted that the electronic device is not restricted to the intelligent TV.

As shown in FIG. 2, the input interface 11 is disposed on a surface of the remote controller 10. Moreover, the input interface 11 comprises plural function keys 11a, a character keyboard 11b, and a touchpad 11c. The input signals generated by the plural function keys 11a are used for controlling the basic functions of the intelligent TV (e.g. the sound volume, screen brightness, or the like). The input signals generated by the character keyboard 11b are used for inputting characters or symbols (e.g. numbers, English letters, or the like). By sensing the user's gestures, the input signals generated by the touchpad 11c are used for executing special commands (e.g. a next page command, a zoom command, a rotation command, or the like).

In some other embodiments, the input interface 11 comprises one of the function key group (i.e. the plural function keys), the character keyboard and the touchpad, or a combination of any two of the function key group, the character keyboard and the touchpad, but is not limited thereto. Moreover, the functions corresponding to the input signals from the plural function keys, the character keyboard and the touchpad are not restricted to the above-mentioned functions. For example, if only the touchpad is installed in the remote controller, the touchpad is used to sense and identify different gestures, thereby controlling the basic functions, the functions of inputting characters or symbols and the functions of executing special commands.

Please refer to FIG. 1 again. The angle sensor 12 and the microprocessor 13 are disposed within the remote controller 10. Moreover, the angle sensor 12 is electrically connected with the microprocessor 13. The angle sensor 12 is used for detecting a rotation angle $\alpha$ of the remote controller 10 (see FIG. 2). Moreover, according to the magnitude of the measured rotation angle $\alpha$, the angle sensor 12 generates a first angle signal or a second angle signal. The microprocessor 13 is used for receiving the first angle signal or the second angle signal, and judging a usage status of the remote controller 10 according to the first angle signal or the second angle signal. In an embodiment, the angle sensor 12 is a gyroscope, but is not limited thereto.

In this embodiment, according to the rotation angle $\alpha$ of the remote controller 10, the microprocessor 13 can judge whether the remote controller 10 is being used or will be used. If the rotation angle $\alpha$ of the remote controller 10 is smaller than a predetermined angle, the remote controller 10 may face the intelligent TV even though the input interface 11 of the remote controller 10 is not triggered and no input signal is generated. Under this circumstance, the microprocessor 13 judges that the remote controller 10 is being used or will be used. On the other hand, if the rotation angle $\alpha$ of the remote controller 10 is larger than the predetermined angle, the remote controller 10 does not face the intelligent TV. Under this circumstance, the microprocessor 13 judges that the remote controller 10 is idled.

For example, the predetermined angle is 30 degrees, but is not limited thereto. Hereinafter, the present invention will be illustrated by referring the predetermined angle as 30 degrees. As shown in FIG. 2, the central axel line L of the remote controller 10 is a reference line. The rotation angle $\alpha$ of the remote controller 10 is an included angle between the central axel line L of the remote controller 10 and a vertical line V. If the rotation angle $\alpha$ of the remote controller 10 is smaller than 30 degrees, the angle sensor 12 generates the first angle signal, and the first angle signal is transmitted from the angle sensor 12 to the microprocessor 13.

After the first angle signal is received by the microprocessor 13, the input interface 11 is enabled. Once the input interface 11 is triggered by the user, the input interface 11 generates an input signal to control the intelligent TV. On the other hand, if the input interface 11 has not been triggered for a predetermined time period after the input interface 11 is enabled, the remote controller 10 is considered to be idled. Under this circumstance, the microprocessor 13 is operated in a power-saving mode, so that a power-saving purpose of the remote controller 10 is achieved.

Moreover, if the rotation angle $\alpha$ of the remote controller 10 is larger than 30 degrees, the angle sensor 12 generates the second angle signal, and the second angle signal is transmitted from the angle sensor 12 to the microprocessor 13. After the second angle signal is received by the microprocessor 13, the microprocessor 13 is operated in the power-saving mode, and the input interface 11 is disabled. Consequently, the power-saving purpose of the remote controller 10 is achieved and the problem of erroneously operating the remote controller 10 is avoided. After the input interface 11 is disabled, even if the input interface 11 is touched or pressed by the user, no input signal is generated by the input interface 11. In this embodiment, the remote controller 10 as shown in FIG. 2 is rotated in the clockwise direction. It is noted that the operations of the remote controller 10 in response to an anti-clockwise rotation are identical to the above-mentioned operations.

Figure 3:
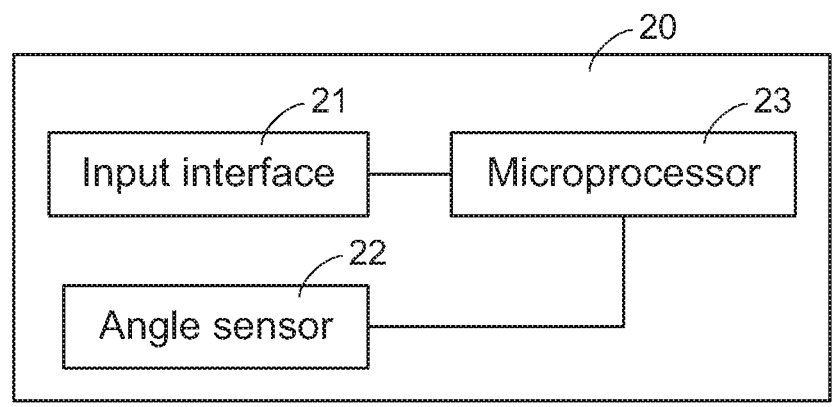
FIG. 3 is a schematic functional block diagram illustrating a remote controller according to a second embodiment of the present invention.
Figure 4:
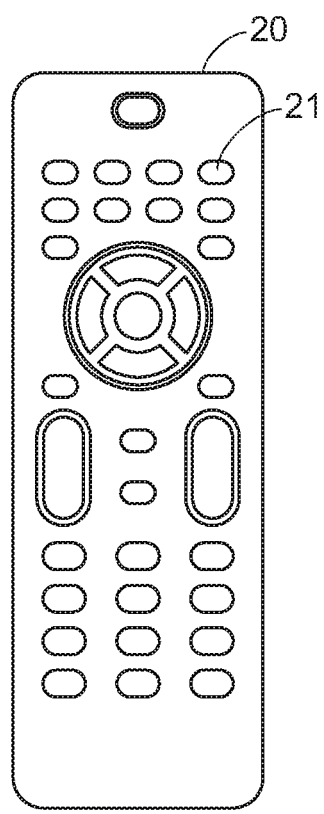
FIG. 4 schematically illustrates the outer appearance of the remote controller according to the second embodiment of the present invention.

The present invention further provides a remote controller according to a second embodiment. In comparison with the first embodiment as shown in FIG. 2, the remote controller of the second embodiment has different input interfaces, uses the X axis as the rotation reference, and further generates a third angle signal and a second input signal. The other components and the other operations of the remote controller of the second embodiment are substantially identical to those of the first embodiment, and are not redundantly described herein. FIG. 3 is a schematic functional block diagram illustrating a remote controller according to a second embodiment of the present invention. FIG. 4 schematically illustrates the outer appearance of the remote controller according to the second embodiment of the present invention.

As shown in FIGS. 3 and 4, the remote controller 20 comprises an input interface 21, an angle sensor 22, and a microprocessor 23. As shown in FIG. 3, the input interface 21 is electrically connected with the microprocessor 23 for generating a first input signal or a second input signal, thereby controlling the operations of an electronic device. Hereinafter, the present invention will be illustrated by referring an intelligent TV as the electronic device. It is noted that the electronic device is not restricted to the intelligent TV.

As shown in FIG. 4, the input interface 21 comprises plural function keys, and the plural function keys are disposed on a surface of the remote controller 20. In this embodiment, the first input signal generated by the input interface 21 is used for controlling the basic function of the intelligent TV (e.g. the sound volume, screen brightness, or the like). Moreover, the second input signal generated by the input interface 21 is used for inputting a character or a symbol (e.g. a number, an English letter, or the like). It is noted that the functions of the first input signal and the second input signal are not restricted to the above functions.

Moreover, the angle sensor 22 is electrically connected with the microprocessor 23. The angle sensor 22 is used for detecting a rotation angle $\beta$ of the remote controller 20 about an X axis (see FIG. 5). Moreover, according to the magnitude of the measured rotation angle $\beta$ about the X axis, the angle sensor 22 generates a first angle signal, a second angle signal or a third rotation angle.

Figure 5:
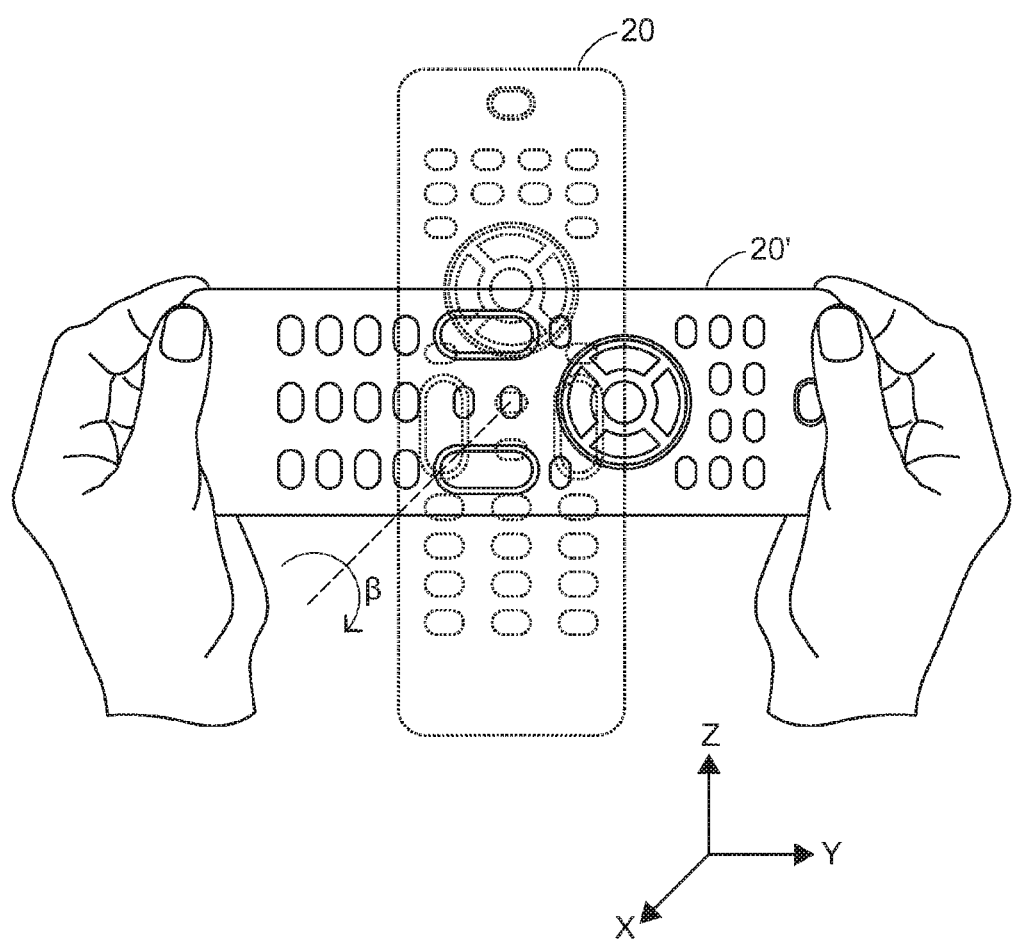
FIG. 5 schematically illustrates the actions of the remote controller according to the second embodiment of the present invention.

FIG. 5 schematically illustrates the actions of the remote controller according to the second embodiment of the present invention. Firstly, the remote controller 20 is rotated about the X axis in a clockwise direction to the position of the remote controller 20' as shown in FIG. 5. If the rotation angle $\beta$ of the remote controller 20 about the X axis is smaller than a first predetermined angle, the angle sensor 22 generates the first angle signal, and the first angle signal is transmitted from the angle sensor 22 to the microprocessor 23. After the first angle signal is received by the microprocessor 23, the input interface 21 is enabled. Consequently, the input interface 21 may be triggered by the user. Once the input interface 21 is triggered by the user, the input interface 21 generates a first input signal to control the intelligent TV.

If the rotation angle $\beta$ of the remote controller 20 about the X axis is larger than the first predetermined angle and smaller than a second predetermined angle, the angle sensor 22 generates the second angle signal, and the second angle signal is transmitted from the angle sensor 22 to the microprocessor 23. After the second angle signal is received by the microprocessor 23, the microprocessor 23 is operated in a power-saving mode, and the input interface 21 is disabled. Consequently, the power-saving purpose of the remote controller 20 is achieved and the problem of erroneously operating the remote controller 20 is avoided. After the input interface 21 is disabled, even if the input interface 21 is touched or pressed by the user, no input signal is generated by the input interface 21.

If the rotation angle β of the remote controller 20 about the X axis is larger than the second predetermined angle, the angle sensor 22 generates the third angle signal, and the third angle signal is transmitted from the angle sensor 22 to the microprocessor 23. After the third angle signal is received by the microprocessor 23, the input interface 21 is enabled. Consequently, the input interface 21 may be triggered by the user. Once the input interface 21 is triggered by the user, the input interface 21 generates a second input signal to control the intelligent TV. In an embodiment, the first predetermined angle is 30 degrees, and the second predetermined angle is 60 degrees. In other words, the remote controller 20 in the portrait orientation and the remote controller 20 in the landscape orientation can be operated to generate different input signals, thereby controlling different functions of the intelligent TV.

Like the first embodiment, if the input interface 21 has not been triggered for a predetermined time period after the input interface 21 is enabled, the remote controller 20 is considered to be idled. Under this circumstance, the microprocessor 23 is operated in a power-saving mode, so that a power-saving purpose of the remote controller 20 is achieved. In this embodiment, the remote controller 20 as shown in FIG. 4 is rotated in the clockwise direction. It is noted that the operations of the remote controller 20 in response to an anti-clockwise rotation are identical to the above-mentioned operations.

Figure 6:
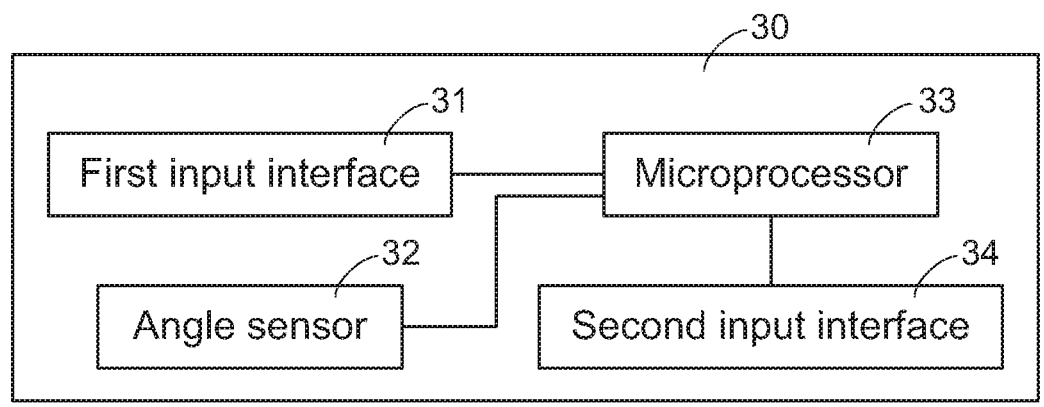
FIG. 6 is a schematic functional block diagram illustrating a remote controller according to a third embodiment of the present invention.
Figure 7:
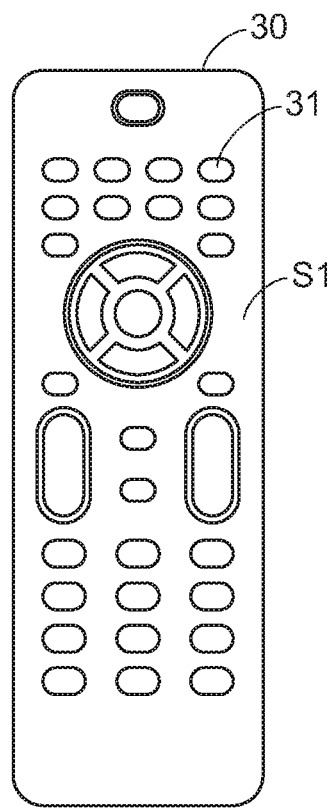
FIG. 7 schematically illustrates the outer appearance of the remote controller according to the third embodiment of the present invention.

The present invention further provides a remote controller according to a third embodiment. In comparison with the first embodiment as shown in FIG. 2, the remote controller of the third embodiment uses the Z axis as the rotation reference, further comprises a second input interface, and further generates a third angle signal and a second input signal. FIG. 6 is a schematic functional block diagram illustrating a remote controller according to a third embodiment of the present invention. FIG. 7 schematically illustrates the outer appearance of the remote controller according to the third embodiment of the present invention.

As shown in FIGS. 6 and 7, the remote controller 30 comprises a first input interface 31, a second input interface 34, an angle sensor 32, and a microprocessor 33. The first input interface 31 is disposed on a first surface S1 of the remote controller 30, and the second input interface 34 is disposed on a second surface S2 of the remote controller 30 (see FIG. 8). The first surface S1 and the second surface S2 of the remote controller 30 are in parallel with each other. In this embodiment, the first surface Si of the remote controller 30 is a top surface of the remote controller 30, and the second surface S2 of the remote controller 30 is a bottom surface of the remote controller 30.

The first input interface 31 comprises one of a function key group (i.e. plural function keys), a character keyboard and a touchpad, or a combination of any two or any three of the function key group, the character keyboard and the touchpad. The second input interface 34 comprises one of a function key group (i.e. plural function keys), a character keyboard and a touchpad, or a combination of any two or any three of the function key group, the character keyboard and the touchpad. In this embodiment, the first input interface 31 comprises plural function keys, and the second input interface 34 comprises a character keyboard, but is not limited thereto.

As shown in FIG. 6, the first input interface 31 is electrically connected with the microprocessor 33 for generating a first input signal, and the second input interface 34 is electrically connected with the microprocessor 33 for generating a second input signal. The first input signal and the second input signal are used for controlling the operations of an electronic device. The angle sensor 32 is electrically connected with the microprocessor 33. The angle sensor 32 is used for detecting a rotation angle γ of the remote controller 30 about the Z axis. Moreover, according to the magnitude of the measured rotation angle γ about the Z axis, the angle sensor 32 generates a first angle signal, a second angle signal or a third rotation angle.

Hereinafter, the present invention will be illustrated by referring an intelligent TV as the electronic device. It is noted that the electronic device is not restricted to the intelligent TV. In this embodiment, the first input signal is used for controlling the basic function of the intelligent TV (e.g. the sound volume, screen brightness, or the like). Moreover, the second input signal is used for inputting a character or a symbol (e.g. a number, an English letter, or the like).

Figure 8:
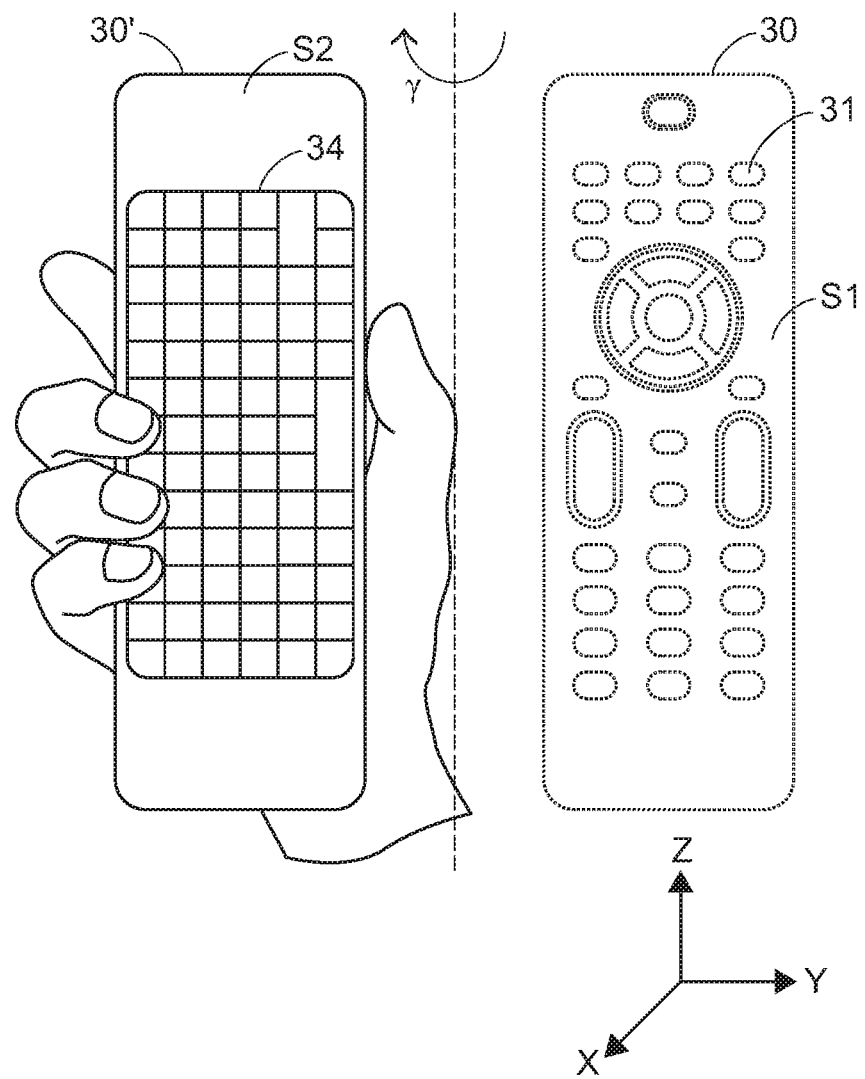
FIG. 8 schematically illustrates the actions of the remote controller according to the third embodiment of the present invention.

FIG. 8 schematically illustrates the actions of the remote controller according to the third embodiment of the present invention. Firstly, the remote controller 30 is rotated about the Z axis in a clockwise direction to the position of the remote controller 30' as shown in FIG. 8. If the rotation angle γ of the remote controller 30 about the Z axis is smaller than a first predetermined angle, the first input interface 31 is located over the second input interface 34. Meanwhile, the angle sensor 32 generates the first angle signal, and the first angle signal is transmitted from the angle sensor 32 to the microprocessor 33. Then, the first input interface 31 is enabled by the microprocessor 33, and the second input interface 34 is disabled by the microprocessor 33. Consequently, the first input interface 31 may be triggered by the user. Since the second input interface 34 is disabled, even if the second input interface 34 is touched or pressed by the user, no input signal is generated by the second input interface 34. Consequently, the problem of erroneously triggering the second input interface 34 is avoided. Moreover, once the first input interface 31 is triggered by the user, the first input interface 31 generates a first input signal to control the intelligent TV.

If the rotation angle γ of the remote controller 30 about the Z axis is larger than the first predetermined angle and smaller than a second predetermined angle, the angle sensor 32 generates the second angle signal, and the second angle signal is transmitted from the angle sensor 32 to the microprocessor 33. Then, the microprocessor 33 is operated in a power-saving mode, and the first input interface 31 and the second input interface 34 are both disabled. Consequently, the power-saving purpose of the remote controller 30 is achieved.

If the rotation angle γ of the remote controller 30 about the Z axis is larger than the second predetermined angle, the first input interface 31 is located under the second input interface 34. Meanwhile, the angle sensor 32 generates the third angle signal, and the third angle signal is transmitted from the angle sensor 32 to the microprocessor 33. Then, the second input interface 34 is enabled by the microprocessor 33, and the first input interface 31 is disabled by the microprocessor 33. Consequently, the second input interface 34 may be triggered by the user. Since the first input interface 31 is disabled, even if the first input interface 31 is touched or pressed by the user, no input signal is generated by the first input interface 31. Consequently, the problem of erroneously triggering the first input interface 31 is avoided. Moreover, once the second input interface 34 is triggered by the user, the second input interface 34 generates a second input signal to control the intelligent TV.

In an embodiment, the first predetermined angle is 30 degrees, and the second predetermined angle is 60 degrees. In other words, the first input interface 31 and the second input interface 34 of the remote controller 30 are used to generate different input signals, thereby controlling different functions of the intelligent TV. Moreover, when one of the input interfaces is enabled, the other input interface is disabled. Consequently, the problem of erroneously triggering the disabled input interface is avoided, and the use of the remote controller is more convenient.

Like the first embodiment, if the first input interface 31 or the second input interface 34 has not been triggered for a predetermined time period after being enabled, the remote controller 30 is considered to be idled. Under this circumstance, the microprocessor 33 is operated in a power-saving mode, and the first input interface 31 and the second input interface 34 are both disabled. Consequently, a power-saving purpose of the remote controller 30 is achieved. In this embodiment, the remote controller 30 as shown in FIG. 6 is rotated in the clockwise direction. It is noted that the operations of the remote controller 30 in response to an anti-clockwise rotation are identical to the above-mentioned operations.

From the above descriptions, the present invention provides a remote controller. The remote controller comprises an input interface, an angle sensor, and a microprocessor. The angle sensor is used for detecting a rotation angle of the remote controller, and generating different angle signals according to the magnitude of the rotation angle. The microprocessor is used for judging the usage status of the remote controller according to the angle signal, and automatically enabling or disabling the input interface according to the usage status of the remote controller.

As a consequence, the idled remote controller can quickly enter the power-saving mode, and the problem of erroneously operating the remote controller can be avoided. Moreover, according to different angle signals, different input interfaces may be enabled, or one input interface may be switched to another input interface to generate a different input signal. Consequently, the use of the remote controller of the present invention is more convenient and more humanized.

While the invention has been described in terms of what is presently considered to be the most practical and preferred embodiments, it is to be understood that the invention needs not be limited to the disclosed embodiments. On the contrary, it is intended to cover various modifications and similar arrangements included within the spirit and scope of the appended claims which are to be accorded with the broadest interpretation so as to encompass all such modifications and similar structures.

What is claimed is:

1. A remote controller of an electronic device, comprising:
   a first input interface operationally enabled and manipulated to generate a first input signal for controlling a first set of functions of said electronic device;
   a second input interface operationally enabled and manipulated to generate a second input signal for controlling a second set of functions of said electronic device;
   an angle sensor for detecting a rotation angle of said remote controller, generating a first angle signal when a magnitude of said rotation angle is less than a first preset value, generating a second angle signal when a magnitude of said rotation angle lies between the first preset value and a second preset value, and generating a third angle signal when a magnitude of said rotation angle is larger than said second preset value; and
   a microprocessor enabling said first input interface to be manipulated to generate said first input signal in response to said first angle signal, suspending said first input interface from being manipulated to generate said first input signal in response to said second angle signal, wherein said remote controller enters a power-saving mode in response to said second angle signal, and enabling said second input interface to be manipulated to generate said second input signal in response to said third angle signal.

2. The remote controller according to claim 1, wherein if said first input interface has not been triggered for a predetermined time period after said first input interface is enabled, or said second input interface has not been triggered for a predetermined time period after said second input interface is enabled, said microprocessor enters the power-saving mode.

3. The remote controller according to claim 1, wherein said first input interface and said second input interface are both arranged on a first surface of said remote controller, and said rotation angle corresponds to rotation about an axis normal to the first surface.

4. The remote controller according to claim 1, wherein said first input interface is disposed on a first surface of said remote controller, and said second input interface is disposed on a second surface of said remote controller, wherein said first surface and said second surface are in parallel with each other.

5. The remote controller according to claim 1, wherein each of said first input interface and said second input interface comprises plural function keys, a character keyboard or a touchpad.

6. The remote controller according to claim 1, wherein if said angle sensor generates said first angle signal, said second input interface is disabled by said microprocessor, wherein if said angle sensor generates said third angle signal, said first input interface is disabled by said microprocessor.

7. The remote controller according to claim 1, wherein said angle sensor is a gyroscope.

* * * * *